Nov. 27, 1923.

C. A. WALES 1,475,330

VEHICLE FRAME

Filed March 16, 1921

Inventor
Claude A. Wales,
By his Attorney

Patented Nov. 27, 1923.

1,475,330

UNITED STATES PATENT OFFICE.

CLAUDE A. WALES, OF BROOKLYN, NEW YORK, ASSIGNOR TO THE PASSENGER LORRY COMPANY, A CORPORATION OF DELAWARE.

VEHICLE FRAME.

Application filed March 16, 1921. Serial No. 452,686.

*To all whom it may concern:*

Be it known that I, CLAUDE A. WALES, a citizen of the United States, and resident of Brooklyn, in the county of Kings and State of New York, have invented certain new and useful Improvements in Vehicle Frames, of which the following is a specification.

This invention relates to vehicle frames, particularly to the frames of lorries or buses for the transportation of passengers and freight, wherein a special construction of frame is desirable in order to enable the passengers to enter and leave without an objectionable number of steps up and down, and also enabling the entrance and exit of the passengers to be under the direct observation and control of the driver. For freight similar conditions apply in order to save time at stops.

In dealing with the problems of safely, quickly and economically handling passengers with buses operated by one man who may have to collect fares, make change, operate doors, and answer questions, besides taking on and letting off passengers, watching other traffic, and controlling his motor, speed, and brakes, it is found that unnecessary and expensive delays occur where there are several steps to be negotiated between the ground and the car floor. It is further found that a momentary crowding of passengers within the car on an intermediate loading platform is unobjectionable, provided that they do not interfere with the controls and doors, where the latter are used. It is further found that even with the lowest practicable forms of motor vehicle spring suspensions, intended to lower present frames, several steps are necessary between the floor and the ground, as motor vehicle interior frames have to be of considerable depth to obtain light weight and connot be dropped sufficiently to eliminate a step and still retain the necessary road clearance, unless made shallow and excessively heavy.

I have therefore devised a light motor vehicle frame especially intended for passenger vehicles, which can be hung as low as the necessary clearance permits on any desired form of spring suspension, and recessed on one side to provide a support for an intermediate depressed platform inside the outside line of the body, constituting a pit. This platform is preferably opposite the driver's side, is of dimensions to hold several standing passengers at once, and can be practically in the lowest clearance plane of the chassis, or an easy step above the ground.

I have found that present standard practice of providing a chassis with longitudinal main members between the wheels introduces unnecessary limitations into the design of a passenger or freight lorry having an intermediate entrance pit or platform one step above the ground, because of weight and also unnecessary elevation of the body and seats. According to this invention, the frame includes longitudinal or outside sill members, which, together with the end members enclose the wheels, being of substantially rectangular form and enabling the floor to be placed directly thereon and also the body side frame uprights to be carried up directly from the outside body sill or frame members. Thus the chassis frame is of about the width and length of the entire vehicle, and is strengthened by the body so that the whole constitutes an entirety simply resting on the springs and running gear and enclosing the wheels. Such structure does not exceed the width permitted by municipal ordinances and State laws, is lighter as a whole than previous constructions, is cheaper to build because of standard sections, and does not reduce the turning radius of the front wheels. Moreover there is ample vertical space on each side of the engine for front springing movement, and the rear springing movement is under the longitudinal seats, so that the aisle is about as low as can be had and still leave the necessary clearance for the differential housing.

The invention is shown herein in two forms, one for a conventional two ton truck type, and the other more particularly adapted for a light passenger lorry using a standard one ton truck propulsion system.

Figure 1:
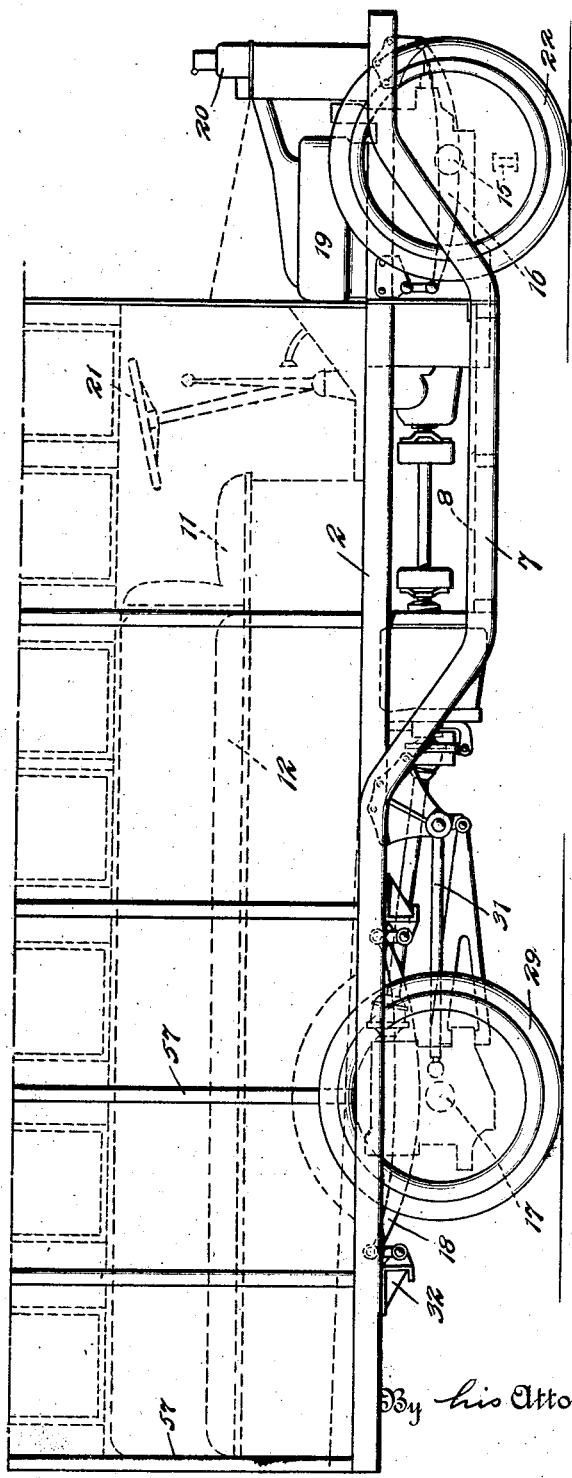
Figure 1 is an elevation of a vehicle embodying the invention.
Figure 2:
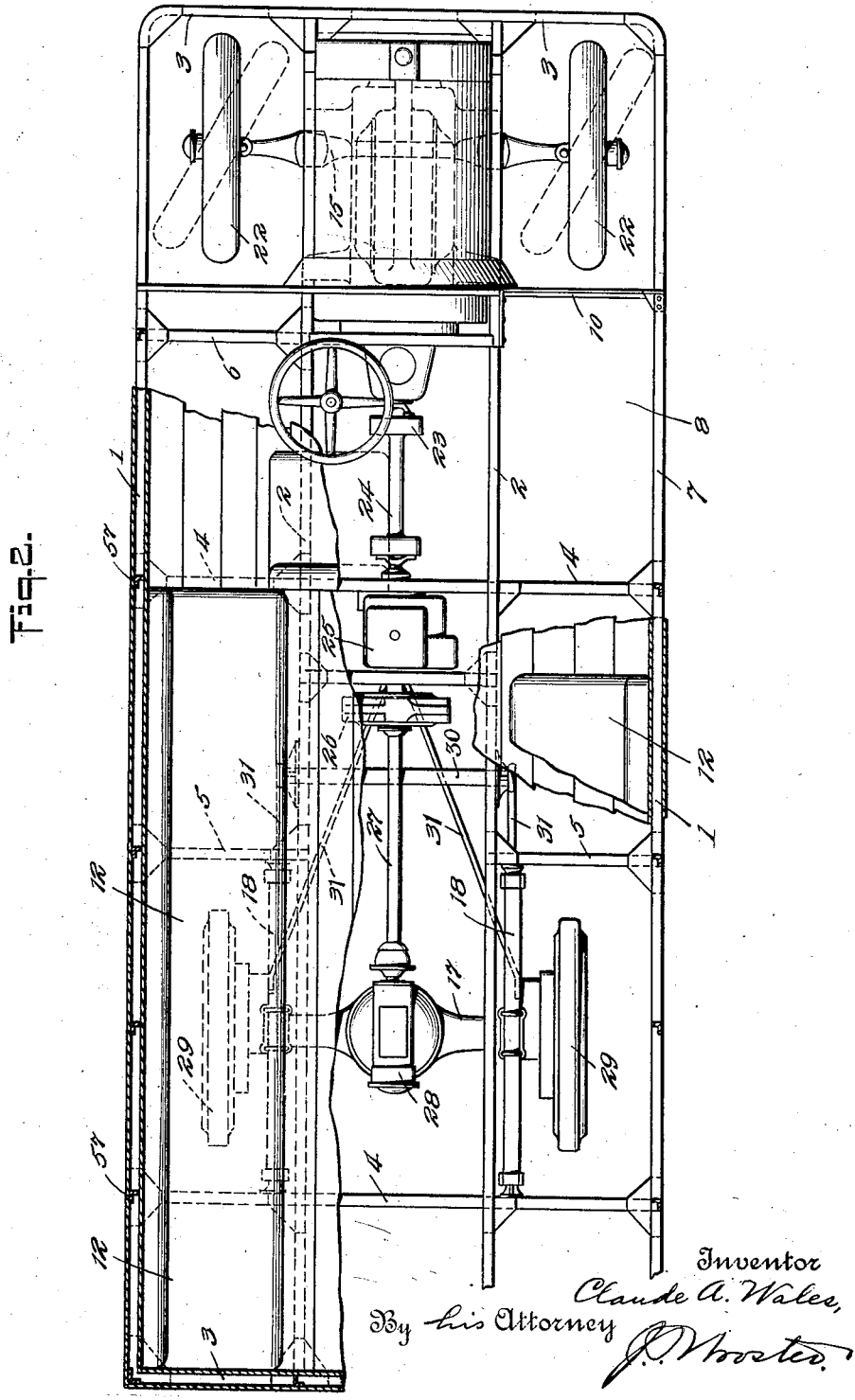
Figure 2 is a plan view.

Referring to Figures 1 and 2, the frame consists of outside body sill or longitudinal members 1—1 extending at least the greater part of the length of the frame and inside or interior longitudinal members 2—2 connected by end members 3—3 and cross members 4—4. Also in front of the rear wheels are short members 5—5, interrupted between the members 2—2 in order to clear the rear axle, and between members 2—2 and the left side member 1 is a member 6 supporting the rear end of power plant and stiffening that side of the frame.

The outside body sill member 1 on which the entrance platform is to be carried is deflected or bent downwardly as at 7 so as to provide a pit space and carry the entrance platform 8 therein, extending from well inside the frame outwardly to the side line thereof supported on the depressed portion 7 of the longitudinal or body side sill member 1, the intermediate crossing member 4, and the adjacent inside longitudinal member 2.

This platform 8, or pit, can readily be brought one easy step above the ground, or at about the height of a curb so as to permit a passenger easy ingress and egress. The front vertical wall of the pit is provided with a plate 10 fastened between the adjacent members 1, 2. To the left of the platform 8, because this is a right entrance left drive vehicle, is a floor carried directly on the frame members 1—1, 2—2, carrying the driving seat 11 and the longitudinal seats shown in outline by line 12 in Figure 2, and elevation in Figure 1. The driver is thus out of the way of passengers entering and leaving, and is sufficiently above them so as to supervise the loading and unloading being an easy step above said platform 8.

The distinction between a narrow step and the wide platform of this invention is due to the modification effected by this invention in what has hitherto been standard chassis frame construction. As is well-known, this comprises two longitudinal members relatively widely spaced, parallel or tapering forward to or in front of the wind-shield and frequently narrowed to shorten the turning radius. Such constructions only permit a narrow lower step between the outside line of the body and the nearest frame member of hardly more depth than an ordinary running board and frequently the same as a running board, whereas a special formation of frame is essential in order to provide the depressed relatively deep entrance platform of this invention. This platform may be supported in several ways, but in each instance a depressed platform is formed within one step of the ground and extending well into the vehicle, and of a size adapted to hold several passengers, as distinguished from the narrow and usually high step of present passenger bus practice. The standard chassis frame design is modified by dropping at least one of the chassis frame side or sill members low enough to support the one step entrance platform. Special provision against weaving and torsional stresses is provided as well as the location of the driver's seat where his view is unobstructed and the accident hazard minimized.

The front wheels are carried on an axle 15 supported by semi-elliptic springs 16 on the intermediate members 2. The rear axle 17 is similarly supported by springs 18 attached at the rear end to cross member 4 and at the front end to the short members 5. 19 represents the engine supported in the forward portion of the vehicle frame, 20 the radiator, 21 the steering wheel connected to the front wheels 22 through the usual steering gear not shown. 23 represents the clutch, 24 the shaft leading to transmission 25 then to universal 26, propeller shaft 27, the worm gear in housing 28 and driving the rear wheels 29 through the usual worm pinion and differential. This being a top drive worm the shaft 27 is above the supplemental cross member 30 which is connected between intermediate longitudinal members 2. As shown in the drawings the various members are connected by gusset plates at necessary places. 31 are distance rods of usual type. The clutch pedals and brake pedals and levers, speed controls, etc., are of usual type shown in outline and are not indicated in detail. By mounting the rear springs 18 as shown on plates 32 depending from the cross members 4, 5, the effect of underslinging is secured, but the design can be so made as to bring the attachment of springs 18 directly on the underside of rear axle 17. As appears from Figure 2 the front wheels are thus enclosed within the frame, the dotted lines showing the limitation of turning which angle is about 35° clear and furnishes ample assurance of turning space. The engine is suitably mounted as stated at the rear end on members 6, and may be bolted at the sides to members 2 and at the front will be supported on a cross member under or behind the radiator. Also, of course the usual three point engine suspensions may be used with this frame. The front axle at 15 is also bent under the engine as shown in dotted lines in Figure 1 to give the desired clearance.

Figure 3:
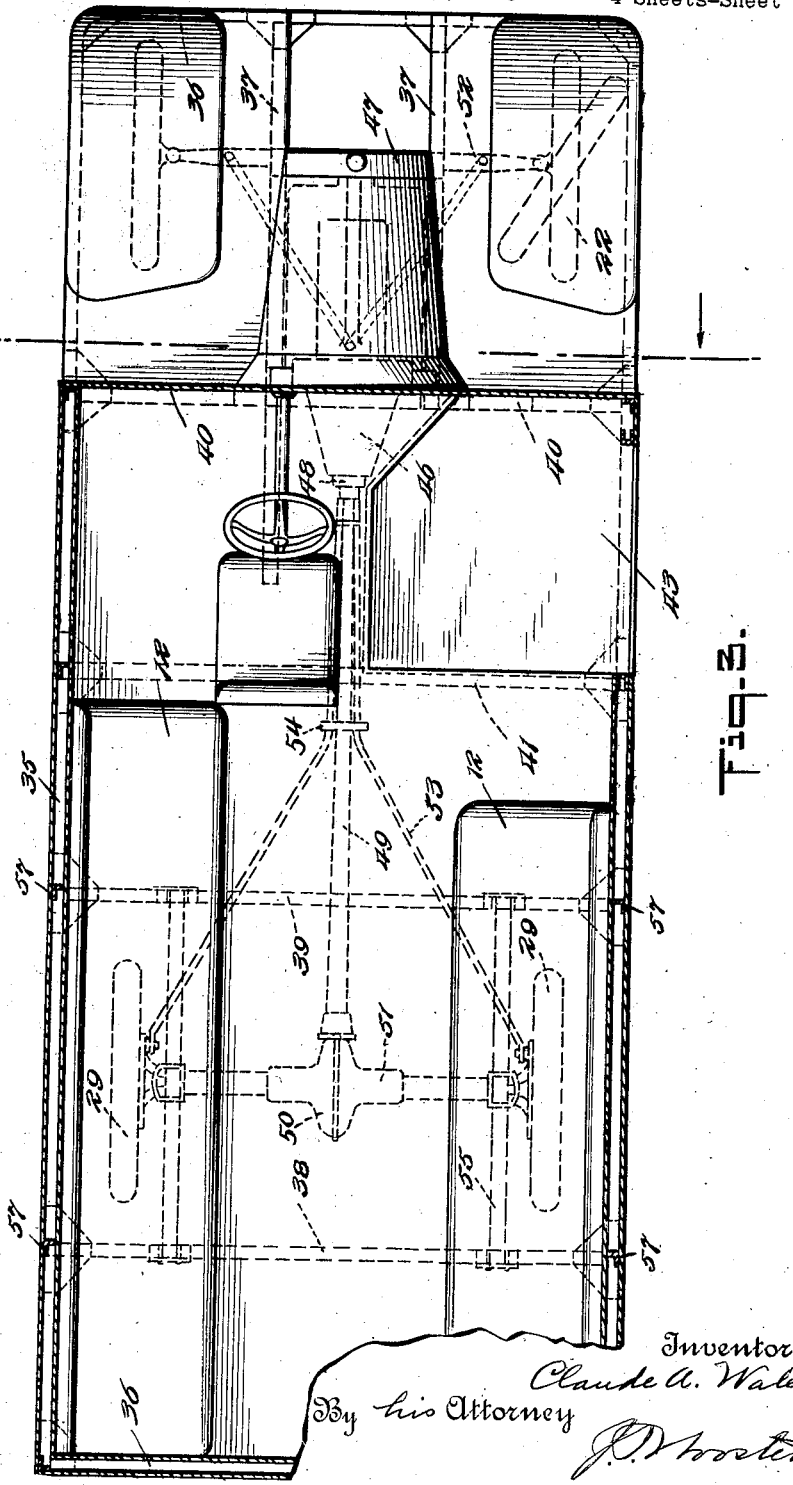
Figure 3 is a plan view of the lighter type of vehicle frame.
Figure 4:
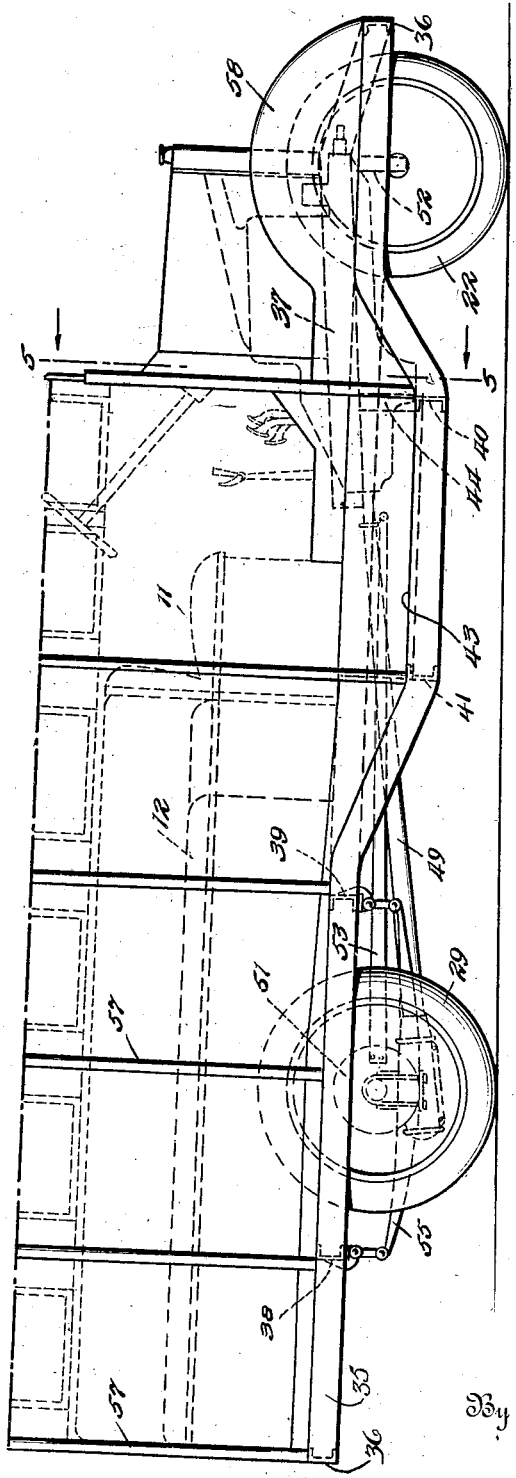
Figure 4 is an elevation.
Figure 5:
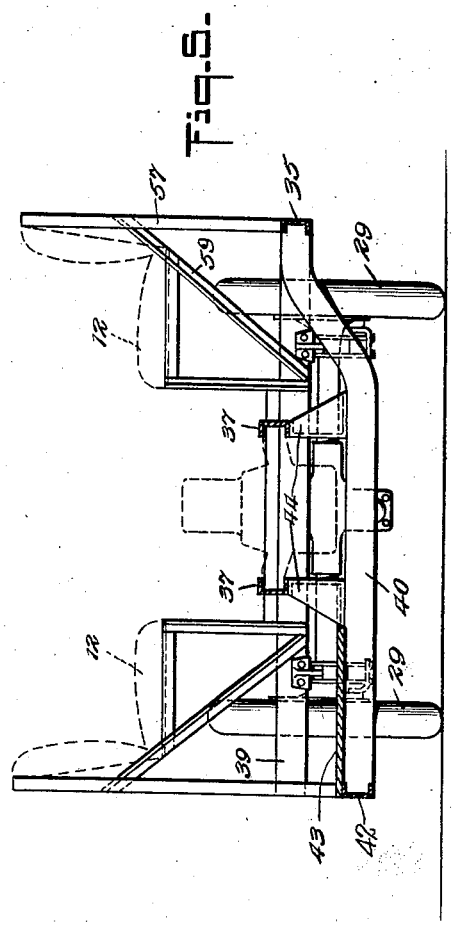
Figure 5 is a cross elevation on about the line 5—5 of Figure 3.

In Figures 3, 4, 5, a lighter construction is shown, consisting of outside body sill or longitudinal frame members 35, extending at least the greater part of the length of the frame, end members 36, at front and rear, intermediate or interior longitudinal members 37 and cross members 38, 39, 40, 41. The right body side sill or longitudinal member 35 is deflected or depressed as at 42, and cross members 40, 41 are each bent downwardly as shown in Figure 5, almost across to the left side. This enables a deep platform 43 to be provided on the depressed portions of members 40, 41 which can extend inwardly past the deflected sill member 35 almost to the center line of the machine. The members 37 are braced and connected to the cross member 40 by buttresses 44, so that a very firm construction is secured. The right side member 37 ends at the cross member 40, or may be depressed to go under the platform 43 parallel and similar to member 35, but this is not generally necessary in a light vehicle of this type because of the bracing effect secured by reason of the platform 43, cross members 40, 41 and longitudinal sill members 35, 37. The left side member 37 extends under the floor to form a support for the brake and clutch levers.

A standard form of engine, clutch and transmission assembly 46 is readily mounted on members 37, 40, with radiator 47 at the front, and universal joint 48 back of the engine casing with torque tube 49 carrying a shaft leading to an under driven worm in housing 50. This entire power line is slightly inclined as shown so as to give a straight line drive. The rear axle assembly 51 is according to standard practice. The front axle is supported on transverse spring 52 and connected by "wish-bone" construction shown in dotted lines in Figure 3, to the engine base. The rear wish-bone 53 is connected to the ends of the rear axle as shown in dotted lines in Figure 3 and is bent in and held by a link 54 so as to clear the inside of the pit and is then connected to the engine frame. This prevents the pit from being narrowed in order to enable the wish-bone to clear the inside wall of the pit.

The rear springs 55 are underslung and attached between cross members 38, 39.

In both forms, the space to the left of the driver's seat is convenient for parcels, etc., or the driver's seat can be moved over to fill this or an extra seat or standing space can be provided for.

In both forms the body sides and uprights 57 are carried directly on the outside members and rear cross member, and the floor is laid directly on the frame. The body structure may comprise a floor, roof, sides, and front and rear portions. Also in both forms front fenders as 58 will be provided over wheels 22 and the rear wheels 29 are practically fended within the body. There being, of course, housings carried within the body for the rear wheels and the body being otherwise sheathed in known manner without requiring particular description.

Figure 5 illustrates an example of the convenience of this construction in stiffening the body side frames by means of diagonals 59 which can run from the intermediate cross members under the seats to the uprights 57 in front and behind the rear wheels 29, these struts 59 also furnishing a foundation on which to mount the side seats 12. It will be understood that I do not restrict myself to this precise seating arrangement, as cross seats can also be used without dispensing with struts 59, or by slightly lowering them, or these vehicles may be used entirely for freight. The roof framing connecting uprights 57 is not shown, as this is similar to standard railroad steel car practice, giving a stiff but light structure.

Although I have illustrated and described the preferred construction in two forms in considerable detail, it is to be understood that I do not restrict myself to such details except as required by the appended claims.

This application is similar in some respects to my co-pending application Serial No. 422,779, for Vehicle body, filed November 9, 1920.

What I claim is:

1. A motor vehicle frame comprising an outside substantially straight longitudinal sill member, an oppositely disposed outside longitudinal sill member having a portion thereof depressed, below the correponding portion of said first sill member to be within one step of the frame plane, cross members connecting said sill members at both elevated and depressed portions, at least one of the cross members extending downwardly from the first mentioned sill member and across the frame to the depressed portion of the opposite or second mentioned sill member in a plane below the frame top plane to cooperate with the depressed sill member in carrying a lowered entrance platform, and an entrance platform carried thereon within one step of the frame plane.

2. A motor vehicle frame comprising outside longitudinal members spaced to constitute body side sills, cross frame members adapted with the sill members to directly support a floor, one of said sill members and a cooperating cross member being depressed to lie in a plane one step below the floor plane, an entrance platform carried on the depressed sill and cross member below the floor, said depressed sill member being elevated in front of said platform and carried forward in the general floor plane with said other sill member, front cross members, and engine supporting members between said sill members in front of said depressed cross member.

3. A motor vehicle comprising outside body side sills, and end and intermediate cross members, the sill members and end cross members being elevated at each end to overlie transverse wheel carrying spring attached axles, one axle carrying steering wheels and the other driving wheels, one of said sill members being depressed to bring its top surface within one step of the ground when mounted on said springs, axles and wheels, and certain of said cross members being likewise depressed and connected to brace said depressed sill member, the other body sill member being relatively elevated throughout, a one step entrance platform mounted on said depressed sill and cross members and extending from the side line of the vehicle substantially toward the center line of the frame, and a load carrying floor mounted on the elevated sill and cross members extending transversely from the inner side of the platform to the other side line of the vehicle frame and rearwardly of the platform on both sides to the end of the vehicle frame.

4. A motor vehicle comprising in combination a pair of outside sill members, one of which is substantially horizontal and straight and the other of which is intermediately depressed to within one step from the ground, intermediate longitudinal members constituting an engine support in the forward portion of said frame, rear driving wheels on said frame, a propeller shaft connecting the engine with the rear driving wheels, cross members between and bracing the sill members, at least one of said cross members being deflected to carry an entrance platform one step from the ground and located just behind said engine support and extending from the outside line of the vehicle frame inwardly to substantially midway of the vehicle and adjacent said propeller shaft.

5. In a motor vehicle, the combination with a pair of dirigible front wheels and rear driving wheels, of a motor in the forward portion of the frame, a propeller shaft extending back from the motor to the driving wheels, a pair of outside longitudinal body sill members spaced apart the full width of the vehicle body, an entrance platform in the forward intermediate part of the frame and behind said motor extending inwardly substantially midway of the vehicle, said platform being within one step from the ground and one of said longitudinal sill members being depressed beneath said platform to support the same.

6. A motor vehicle comprising a body structure having a floor, sides and front and rear portions, a cross braced frame below said body structure, having longitudinal members extending the greater part of the length of said frame, one of said members being downwardly deflected to provide a pit space below the main floor level, a depressed entrance platform carried by said member to constitute a floor for said pit and located within an easy step below the top of said longitudinal member, said platform extending substantially inwardly from adjacent the side of the vehicle, and a driver's seat located adjacent said entrance platform.

7. A motor vehicle comprising a pair of dirigible front wheels and rear driving wheels, a motor in the forward portion of the frame, a propeller shaft extending back from the motor to the driving wheels, a pair of longitudinal body sill members outside said rear wheels, cross members bracing said sill members, a floor below the tops of the wheels and laid directly on the sill members to give a low center of gravity to the vehicle, part of the floor being lowered adjacent the forward portion thereof to form an entrance platform extending from substantially the outside line of the frame inwardly to a position adjacent and below said propeller shaft, said platform being a single step substantially midway between the floor and ground, one of said sill members being depressed under said platform, the other of said sill members being substantially straight with its top at the height of the floor.

8. In a motor vehicle, the combination with a pair of dirigible front wheels and rear driving wheels, of a motor in the forward portion of the frame, a propeller shaft extending back from the motor to the driving wheels, a pair of outside longitudinal body sill members spaced apart the full width of the vehicle body, an entrance platform in the intermediate forward part of the frame and behind said motor extending inwardly substantially midway of the vehicle, said platform being within one step from the ground and one of said longitudinal sill members being depressed beneath said platform to support the same, depressed cross members joining said outside sill members at opposite ends of said depressed portion, other cross members connecting said sill members, and springs attaching the axles to the frame members.

9. A vehicle frame comprising in combination a pair of outside longitudinal sill members, an engine support in the forward portion of said frame in substantially the same plane as said frame, a floor laid directly on the frame, one of said longitudinal sill members being depressed one step below the plane of said frame throughout at least a portion of its length, adjacent said engine support, the other longitudinal member being substantially straight and in the plane of the frame, an entrance platform carried by the depressed portion of said longitudinal sill member, and cross members between said longitudinal members, at least one of the cross members carrying said platform and extending from the depressed portion of said longitudinal sill member under the platform across and upward to the plane of the frame and joined to the substantially straight longitudinal sill member.

10. A motor vehicle comprising a body structure having a floor, sides and rear portions, a cross braced frame below said body structure having longitudinal members extending the greater part of the length of said frame and spaced apart substantially the full width of the vehicle frame, one of said members being deflected to provide a pit space below the main floor level, a depressed entrance platform carried by said member to constitute a floor for said pit and located within an easy step below the top of said longitudinal member, said platform extending substantially inwardly from adjacent the side of the vehicle to adjacent the center thereof, the sides being carried directly on said longitudinal members, and a driver's seat located adjacent said entrance platform.

Signed at New York in the county of New York and State of New York this 5th day of March A. D. 1921.

CLAUDE A. WALES.